United States Patent [19]

Hunter

[11] 3,969,458
[45] July 13, 1976

[54] PRICKER ROLL

[75] Inventor: Edward E. Hunter, Akron, Ohio

[73] Assignee: The Goodyear Tire & Rubber Company, Akron, Ohio

[22] Filed: Feb. 3, 1975

[21] Appl. No.: 546,247

Related U.S. Application Data

[62] Division of Ser. No. 354,575, April 26, 1973, Pat. No. 3,891,494.

[52] U.S. Cl. .................... 264/154; 83/2; 83/30; 156/87; 156/252; 264/145; 264/156; 264/171; 264/174; 264/175; 264/294
[51] Int. Cl.² ...................... B29H 3/06; B29H 9/02
[58] Field of Search .......... 264/156, 174, 175, 145, 264/259, 154, 294; 156/87, 252, 510; 83/2, 30

[56] References Cited
UNITED STATES PATENTS

| | | |
|---|---|---|
| 2,186,771 | 1/1940 | Smith ................................ 156/87 |
| 2,770,282 | 11/1956 | Herzegh ............................ 156/87 |
| 3,019,149 | 1/1962 | Bruber .............................. 156/87 |
| 3,062,269 | 11/1962 | Hurst et al. ....................... 156/87 |
| 3,551,270 | 12/1970 | Sharkey ............................ 156/87 |
| 3,607,561 | 9/1971 | Hutz ................................. 156/87 |

Primary Examiner—W.E. Hoag
Attorney, Agent, or Firm—F. W. Brunner; H. E. Hummer

[57] ABSTRACT

A pricker roll used with a machine for calendering reinforcement tire cords with rubber material. The pricker roll produces a pattern of cuts in the thin sheets of rubber material to allow the escapement of air entrapped in the material during the sheet-forming process.

7 Claims, 4 Drawing Figures

PRICKER ROLL

This is a division of application Ser. No. 354,575, filed Apr. 26, 1973, now U.S. Pat. No. 3,891,494.

BACKGROUND OF THE INVENTION

The invention is particularly well suited for use in building tires from rubber material reinforced with wire cords, especially in the calendering operation where the wire tire cords are embedded in the unvulcanized rubber material. Two masses of unvulcanized rubber material are drawn between the nips of two pairs of rollers to form the rubber material into two thin sheets for calendering the wire tire cords. Occasionally, air becomes trapped in the rubber material during this sheet-forming operation. The air bubbles, thus created, must be eliminated since they can cause misorientation of the wire cords during the calendering process. This can be accomplished by continually pricking the sheets of unvulcanized rubber material to allow the escapement of air. Pricker rolls are provided for this purpose and have been used in the past to place a pattern of small circular holes in the thin sheets of unvulcanized rubber material. This particular pattern of cuts, however, has not proved effective in eliminating entrapped air. The invention is directed to providing a highly improved pattern of slots or cuts in the thin rubber sheets used in calendering wire tire cords.

Briefly stated, the invention is in a calender for embedding tire cords in rubber material. The calender comprises at least one rotatable roll for pricking a pattern of configured openings in sheets of rubber material, prior to contact with the tire cords. The roll includes a plurality of teeth which extend in spaced relation from the roll for piercing the rubber material. Each tooth is designed for cutting an elongated slot having its longitudinal axis angularly disposed to the longitudinal axis of the cord reinforced material being formed, or the longitudinal axis of the parallel cords being embedded in the rubber material.

DESCRIPTION OF THE DRAWING

The following description of the invention will be better understood by having reference to the annexed drawing, wherein.

DESCRIPTION OF THE INVENTION

Figure 1:
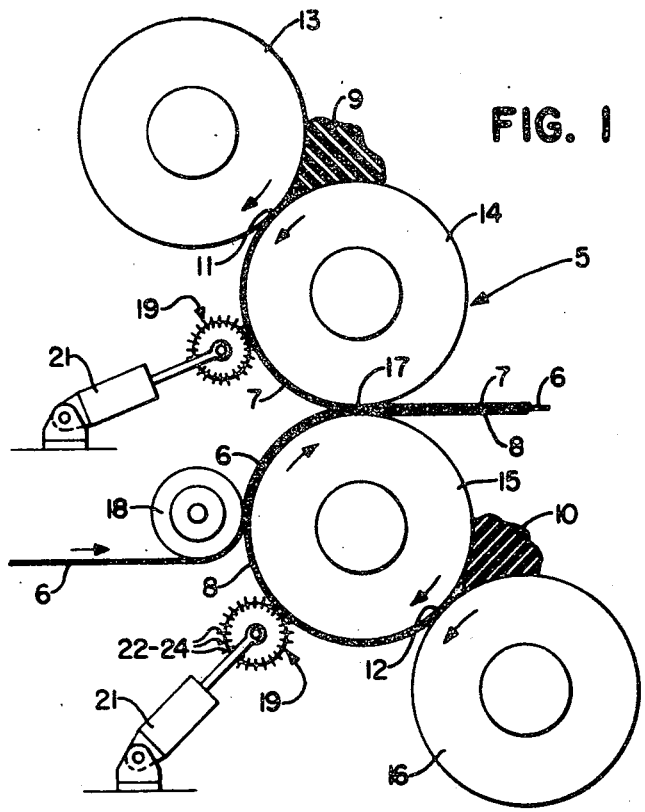
FIG. 1 is a side view of the various rolls essential for calendering tire cords with rubber, and shows the location of the pricker rolls in relation thereto.

Referring particularly to FIG. 1, there is shown a calender 5 for embedding a number of tire cords, e.g. wire 6, in parallel array between two opposing sheets 7 and 8 of unvulcanized rubber material used in the production of tires. The thin sheets 7 and 8 of rubber material are formed by moving masses 9 and 10 of rubber stock through the nips 11 and 12 of two pairs of calender rolls 13 and 14, and 15 and 16, respectively. The thin sheets 7 and 8 of rubber material are then moved through the nip 17 formed between the opposing pair of calender rolls 14 and 15. The tire cords 6 are taken in parallel array from a conventional creel and passed around a small roller 18 prior to moving them between the nip 17 where the tire cords and thin sheets 7 and 8 of rubber material are pressed firmly together to form, for example, breaker or belt ply stock used to annularly reinforce a bias-belted or radial tire. A pair of similarly designed pricker rolls 19 are provided for placing a pattern of cuts, e.g slot 20, in the thin sheets 7 and 8 of rubber material, just prior to the sheets contacting the tire cords 6. Any suitable means such as an air cylinder 21 may be used to reciprocate the pricker rolls 19 into and out of engagement with the thin sheets 7 and 8 of rubber material on the adjacent calender rolls 14 and 15.

Figure 3:
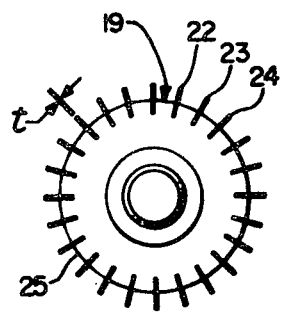
FIG. 3 is an end view of the pricker roll.
Figure 2:
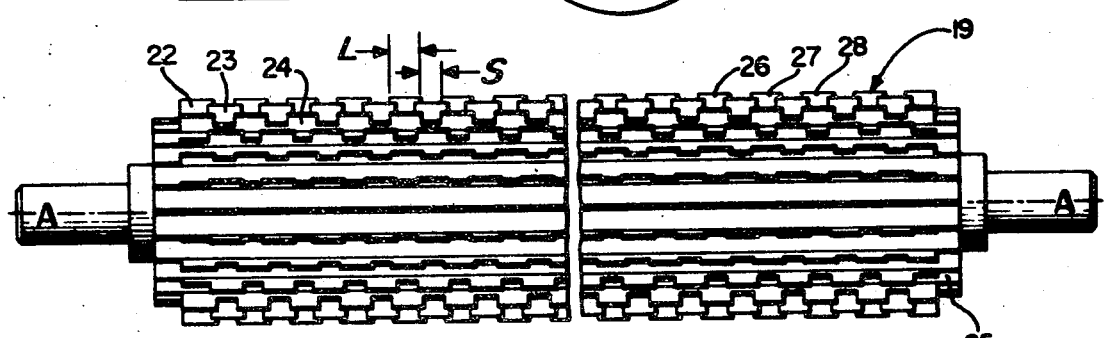
FIG. 2 is a side view of a pricker roll made in accordance with the invention.

The pricker rolls 19, as best seen in FIGS. 2 and 3, each comprise a plurality of blades, e.g. blades 22, 23, and 24, which extend longitudinally of the pricker roll 19 and radially from the outer periphery 25 of the pricker roll 19. The blades 22–24 preferably lie in radial planes containing the longitudinal axis A—A of the pricker rolls 19. The blades may be spiralled about the pricker rolls 19, but such an embodiment would be considerably more expensive to manufacture. The blades are equally angularly spaced about the longitudinal axes A—A of the pricker rolls 19 to produce a continuing pattern of slots in the sheets 7 and 8 of rubber material. It has been found beneficial using from 16 to 32 blades spaced equally around the outer periphery 25 of the rolls 19.

Figure 4:
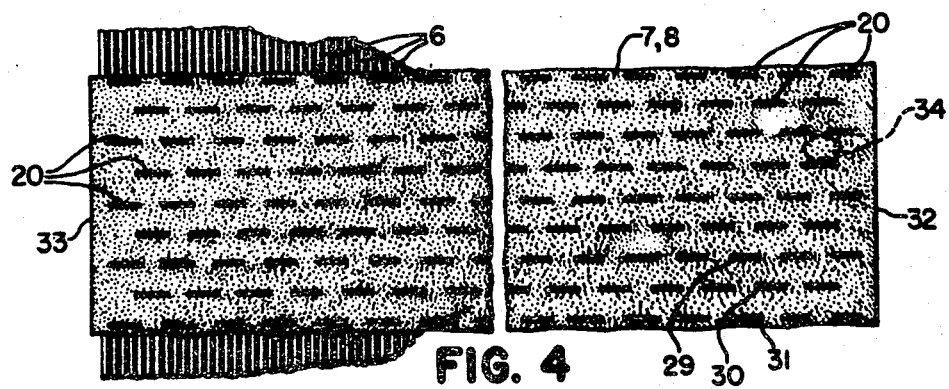
FIG. 4 is a small portion of a sheet of rubber material, illustrating the particular pattern of cuts or slots formed by the pricker roll.

The blades 22–24 each comprise a set of spaced teeth, e.g. the teeth 26–28 of blade 22. The teeth of adjacent blades, as best seen in FIG. 2, are staggered and cut correspondingly staggered slots, e.g. slots 29–31 in the sheets 7 and 8 of rubber material, as best seen in FIG. 4, such that the elongated, rectangular slots of alternate rows of slots will be in crosswise alignment parallel to the longitudinal axis, or edges 32 and 33 of the particular sheet of rubber material in which the pattern of slots is being cut. Accordingly, the teeth of alternate rows of teeth will be in crosswise alignment in planes normal to the rotational axis of the pricker roll 19. The length L of each tooth is made greater than the spacing S between adjacent teeth to provide a series of staggered slots which are overlapping in a lengthwise or axial direction. A good, workable arrangement is teeth having a length L of ½-inches spaced ⅜ inches apart. The thickness t of each tooth is sufficient to displace rubber material and produce a slot or slit which will not close immediately after it is cut, but where there is adequate displaced material to close the individual slots as the slotted material passes through the nip 17 between the main calender rolls 14 and 15. Teeth with a thickness t of 1/32 inches, have been used and found suitable for this purpose. It is theorized that a bubble 34 of air (FIG. 4) entrapped in the rubber material during the sheet-forming process, will be forced back to an adjacent slot, as the rubber material is compressed between the nip of the calender rolls, where the entrapped air will escape into the ambient atmosphere. The teeth of each blade are designed to produce a rectangular shaped slot which will remain at least partially open throughout its length L to provide overlapping escapements for the entrapped air. However, it is important that the slots close during the calendering operation and leave no wire cords bare and exposed to the ambient atmosphere.

Thus, there has been provided an improved pricker roll for placing a better pattern of rubber material used in calendering tire cords for reinforcing tires. The cuts are elongated and rectangular in shape making them less susceptible to closing as the pricked rubber material attempts to resume its original shape.

What is claimed is:

1. In a method of calendering tire cords with unvulcanized rubber material which is formed into a sheet prior to contact with tire cords, the improvement comprising: (a) forming a plurality of spaced, transversely extending rows of slots in the sheet of unvulcanized rubber material prior to contact with the tire cords, each row of slots including a plurality of elongated slots spaced end-to-end, each of the slots having a longitudinal axis which is angularly disposed to a longitudinal axis of the sheet of unvulcanized rubber material; (b) staggering the slots of successive rows of slots; and (c) spanning the spaces between successive slots of each row of slots by slots of rows immediately succeeding each row of slots to enable entrapped air to escape from the sheet of unvulcanized rubber material.

2. The improvement of claim 1, wherein the slots of alternate rows of slots at least span the space between the slots of the rows therebetween.

3. The improvement of claim 2, which includes staggering the slots of adjacent rows of slots such that the slots of alternate rows of slots are in crosswise alignment parallel to the tire cords being contacted by the rubber material.

4. The improvement of claim 3, which includes embedding metal tire cords in parallel array in rubber material which has been previously slotted.

5. The improvement of claim 4, wherein the slots are rectangular and dimensioned such that the slots remain at least partially open throughout their length, prior to the cords contacting the rubber material, but close when the cords and rubber material are compressed together.

6. The improvement of claim 5, wherein the longitudinal axes of the slots are normal to the longitudinal axis of the material.

7. The improvement of claim 6, wherein the length of each slot is greater than the spacing between adjacent slots of each of the rows of slots.

* * * * *